(12) United States Patent
Yu

(10) Patent No.: US 8,255,194 B2
(45) Date of Patent: Aug. 28, 2012

(54) JUDICIOUSLY RETREATED FINITE ELEMENT METHOD FOR SOLVING LUBRICATION EQUATION

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 12/629,281

(22) Filed: Dec. 2, 2009

(65) Prior Publication Data

US 2011/0131019 A1 Jun. 2, 2011

(51) Int. Cl.
G06G 7/50 (2006.01)

(52) U.S. Cl. .......................................................... 703/9
(58) Field of Classification Search ........................ 703/9
See application file for complete search history.

(56) References Cited

U.S. PATENT DOCUMENTS

| | | | |
|---|---|---|---|
| 6,391,986 B1 | 5/2002 | Goode et al. |
| 6,471,761 B2 | 10/2002 | Fan et al. |
| 6,660,209 B2 | 12/2003 | Leyden et al. |
| 6,754,551 B1 | 6/2004 | Zohar et al. |
| 6,913,832 B2 | 7/2005 | Fan et al. |
| 7,022,534 B2 | 4/2006 | Gupta et al. |
| 7,085,695 B2 | 8/2006 | Yu et al. |
| 7,117,138 B2 | 10/2006 | Yu et al. |
| 7,147,306 B2 | 12/2006 | Silverbrook et al. |
| 7,160,633 B2 | 1/2007 | Tai et al. |
| 7,169,989 B2 | 1/2007 | Marks et al. |
| 7,176,040 B2 | 2/2007 | Sirringhaus et al. |
| 2005/0052120 A1 | 3/2005 | Gupta et al. |
| 2007/0043544 A1 | 2/2007 | Song et al. |
| 2007/0136042 A1 | 6/2007 | Yu |
| 2007/0239414 A1 | 10/2007 | Song et al. |
| 2007/0250296 A1 | 10/2007 | Shima et al. |
| 2009/0259447 A1 * | 10/2009 | Langemyr et al. ................ 703/2 |
| 2010/0217574 A1 * | 8/2010 | Usadi et al. ..................... 703/10 |

FOREIGN PATENT DOCUMENTS

| | | |
|---|---|---|
| EP | 0 765 236 B1 | 7/1999 |
| EP | 1 208 985 A2 | 5/2002 |
| JP | 10-256330 | 9/1998 |

OTHER PUBLICATIONS

Liou, M., "A Generalized Procedure for Constructing an Upwind-Based VD Scheme", 25th Aerospace Sciences Meeting, Jan. 12-15, 1987.

Harten, Ami et al., "Uniformly High Order Accurate Essentially Non-Oscillatory Schemes III", Institute for Computer Applications in Science and Engineering NASA, Apr. 1986.

(Continued)

Primary Examiner — David Silver

(57) ABSTRACT

A system and method for simulating a physical process in a simulation domain. Dividing the simulation domain into a first sub-domain and a gap region. The gap region defines a region of a specified width between a contact line of a droplet and the first sub-domain. Generating a mesh that represents the first sub-domain as a plurality of elements. The specification of each element includes an integer element number that represents an order of each element. The specified width of the gap region is on the order of half the width of an element in the first sub-domain adjoining the gap region divided by the integer element number. Using the finite element method and the mesh to calculate a state of the droplet at a first point in time. Using a plurality of evolution equations to calculate the state of the droplet at a second point in time.

14 Claims, 10 Drawing Sheets

OTHER PUBLICATIONS

Chen, et al., Evaporation evolution of volatile Liquid droplets in nanoliter wells, Sensors and Actuators A 130-131, (2006), 12-19.

Guena, G., et al., "Evaporation of sessile liquid droplets", Colloids and Surfaces A: Physicochem Eng. Aspects 291, 2006, pp. 191-196.

Hu, H., et al., "Evaporation of a Sessile Droplet on a Substrate", J. Phys. Chem. B, 2002, 106, pp. 1334-1344.

Schunk, P.R., et al., "Finite element modeling of evaporation and condensation during sol-gel film and fiber formation", VIII International Conference on Finite Elements in Fluids, Barcelona, Spain Sep. 20-24, 1993.

de Gans, Berend-Jan, et al., "Inkjet Printing of Polymers: State of the Art and Future Developments", Advanced Materials, 2004, 16, No. 3, Feb. 3.

Chernyak, V. "The Kinetic Theory of Droplet Evaporation". J. Aerosol Sci. vol. 26, No. 6, pp. 873-885, 1995.

Widjaja, E., et al., "Numerical study of vapor phase-diffusion driven sessile drop evaporation", Elsevier, Computers & Chemical Engineering 32, 2008, pp. 2169-2178.

Bayada, G., et al., "On a free boundary problem for the Reynolds equation derived from the Stokes system with Tresca boundary conditions", Journal of Mathematical Analysis and Applications, J. Math. Anal. Appl. 282, 2003, pp. 212-231.

Deegan, R., "Pattern formation in drying drops", Physical Review E, vol. 61, No. 1, Jan. 2000, pp. 475-485.

Percin G., et al., "Piezoelectric droplet ejector for ink-jet printing of fluids and solid particles", Review of Scientific Instruments, vol. 74, No. 2, Feb. 2003, pp. 1120-1127.

Tarasevich, Y., "Simple analytical model of capillary flow in an evaporating sessile drop", Physical Review E 71, 027201, 2005.

Decent, S.P., "The spreading of a viscous microdrop on a solid surface", Microfluid Nanofluid 2006, 2: 537-549.

Schwartz, L.W., Theoretical and Numerical Modeling of Coating Flow on Simple and Complex Substrates including Rheology, Drying and Marangoni Effects, Advances in Coating and Drying of Thin Films, 1999.

Chen, C., et al., "Uniform Solute Deposition of Evaporable Droplet in nanoliter Wells", Journal of Microelectromechanical Systems, vol. 16, No. 5, Oct. 2007, pp. 1209-1218.

Fischer, B., "Particle Convection in an Evaporating Colloidal Droplet", Langmuir 2002, 18, pp. 60-67.

Bhandarkar, M., et al., "Charm ++ Finite Element Method (FEM) Framework Manual", Oct. 8, 2008, ver. 1.2, Parallel Programming Laboratory, University of Illinois at Urbana-Champaign.

Schwartz, A., et al., "Studies of Dynamic Contact Angles on Solids", National Aeronautics and Space Administration, NASA, contract NA53-11522, Jul. 7, 1970.

Tseng, F.G., et al., "A High-Resolution High-Frequency Monolithic Top-Shooting Microinjector Free of Satellite Drops-Part I: Concept, Design, and Model", Journal of Microelectromechanical Systems, vol. 11, No. 5, Oct. 2002, pp. 427-436.

Pasandideh-Fard, M., et al., "A three-dimensional model of droplet impact and solidification", International Journal of Heat and Mass Transfer 45, 2002, pp. 2229-2242.

Hu, H., et al., "Analysis of the Microfluid Flow in an Evaporating Sessile Droplet", Langmuir 2005, 21, pp. 3963-3971.

Hu, H., et al., "Analysis of the Effects of Marangoni Stresses on the Microflow in an Evaporating Sessile Droplet", Langmuir 2005, 21, pp. 3972-3980.

Deegan, R., et al., "Capillary flow as the cause of ring stains from dried liquid drops", Nature, vol. 389, Oct. 1997, pp. 827-829.

Deegan, R., et al., "Capillary flow as the cause of ring stains from dried liquid drops", James Franck Institute, Chicago, IL, Jul. 15, 1997, pp. 1-4.

Popov, Y.O., et al., "Characteristic Angles in the Wetting of an Angular Region: Deposit Growth", Department of Physics, University of Chicago, Jun. 6, 2003, pp. 1-36.

Deegan, R., et al., "Contact line deposits in an evaporating drop", Physical Review E., vol. 62, No. 1, Jul. 2000, pp. 756-765.

Sultan, E., et al., "Diffusion-limited evaporation of thin polar liquid films", Journal of Engineering Mathematics 50: 2004, pp. 209-222.

Widjaja, E., et al., "Dynamics of sessile droplet evaporation: A comparison of the spine and the elliptic mesh generation methods", Elsevier, Computers & Chemical Engineering 31, 2007, pp. 219-232.

Dussan, E., et al., "On the motion of a fluid-fluid interface along a solid surface", J. Fluid Mech., 1974, vol. 65, part 1, pp. 71-95.

Greenspan, H.P., "On the motion of a small viscous droplet that wets a surface", J. Fluid Mech. 1979, vol. 84, part 1, pp. 125-143.

Lopez, P.G., et al., "Stability and evolution of a dry spot", Physics of Fluids, vol. 13, No. 6, Jun. 2001 American Institute of Physics.

Oron, A., et al., "Long-Scale evolution of thin liquid films", Department of Mechanical Engineering, Reviews of Modern Physics, vol. 69, No. 3, Jul. 1997, The American Physical Society.

Yu, Y., et al., "Capillary flow in an evaporating sessile drop", Aug. 2004.

von Bahr, M., "Wetting and Capillary Flow of Surfactant Solutions and Inks", Lund University.

Bonn, D., et al., "Wetting and spreading", Review of Modern Physics, vol. 81, Apr.-Jun. 2009.

Miranda, L.C.M., et al., "Evaporation and Contraction of a droplet that wets a surface monitored by photoacoustic detection", Physical Review B, vol. 47, No. 7, Feb. 15, 1993.

Cazabat, A.M., "How does a droplet spread?", Contemp. Phys. 1987, vol. 28, No. 4, 347-364.

Moriarty, J.A., et al., "Dynamic Considerations in the Closing and Opening of Holes in Thin Liquid Films", Journal of Colloid and Interface Science 161, 335-342, 1993.

Blake, T.D., et al., "Kinetics of liquid/liquid displacement", Journal of Colloid and Interface Science, vol. 30, issue 3, Jul. 1969, pp. 421-423.

Schwartz, A., et al., "Studies of Dynamic Contact Angles on Solids", Journal of Colloid and Interface Science, vol. 38, No. 2, Feb. 1972, pp. 359-375.

* cited by examiner

JUDICIOUSLY RETREATED FINITE ELEMENT METHOD FOR SOLVING LUBRICATION EQUATION

CROSS-REFERENCE TO RELATED APPLICATIONS

The present application is related to U.S. patent application Ser. No. 12/476,588 filed on Jun. 2, 2009 entitled "A Finite Difference Algorithm for Solving Lubrication Equations with Solute Diffusion" (now U.S. Pat. No. 8,014,986), which is hereby incorporated by reference in its entirety. The present application is also related to U.S. patent application Ser. No. 12/411,810 filed on Mar. 26, 2009 entitled "A Finite Element Algorithm for Solving a Fourth Order Nonlinear Lubrication Equation for Droplet Evaporation", which is hereby incorporated by reference in its entirety. The present application is also related to U.S. patent application Ser. No. 12/579,645 filed on Oct. 15, 2009 entitled "An Upwind Algorithm for Solving Lubrication Equations", which is hereby incorporated by reference in its entirety.

BACKGROUND

1. Field of Invention

The present application is directed towards systems and method for simulating a droplet evaporating on a substrate.

2. Description of Related Art

Applying inkjet technology to the industrial printing process can greatly improve its efficiency. Inkjet technology can be used to save energy, material, money, and it can also help improve the environment. Inkjet technology may be used in the manufacture of liquid crystal displays (LCD), thin film transistors (TFT), organic light emitting diodes (OLED), solar cells, micro-circuits, and other planar, layered, or 3-D structures. In the inkjet printing process, small droplets of a solution containing a solute with the desired properties and a solvent to make the solution jettable are deposited onto the target area. After the droplets reach the targeted area, the solvent evaporates and only the solute is left to form a final print pattern. The final pattern of the deposited solute directly determines the quality of the desired product.

In order to improve the quality of the final product, it is desirable to understand how the final pattern is formed in a realistic environment, what are the major factors affecting the final pattern, and how to control the production parameters in order to achieve a final product with the desired quality. In the final stage of the ink drying process, the aspect ratio of length to height becomes quite large. This makes it difficult to use traditional direct simulation methods to simulate the entire process. Lubrication equations may be applied to describe such phenomenon; however they can be difficult to implement in such a manner that artifacts near the contact line are not introduced. Prior art numerical methods have been limited to simulating systems in which the evaporation rate vanishes at the contact line. Prior art methods can not handle lubrication equations in which the evaporation rate does not vanish at the contact line.

In prior art methods, numerical artifacts creep into the simulation when a non-vanishing evaporation rate is used. An example of this is illustrated in FIGS. 1A-D. The prior art methods may be used to describe a droplet with an initial height profile of $h(r,t=0)=1-r^2$ as shown in FIG. 1A. If radial symmetry is assumed then simulation may be reduced to one dimension. The system variables are written in terms of the axial radius. The system variables may also be averaged over the height of the droplet. It is reasonable to assume that the initial solute concentration is uniform (C=0.01) and that the capillary number is constant Ca=0.001. In this prior art example we assume that the evaporation rate is uniform (J=0.5). A prior art method was used to simulate the evaporation of a droplet, at (t=0.1) the droplet has a new profile shown in FIG. 1A.

FIG. 1B is an illustration of the total velocity integrated along the z-axis of the droplet at t=0.1 produced using a prior art simulation method. FIG. 1B also shows an artifact 102 that is produced when the prior art simulation method is used with a uniform evaporation model, which is a small wiggle close to the contact point of the droplet. FIG. 1C is an illustration of the solute film height which is the product of the concentration and the height (Ch) of the droplet at t=0.1, using a prior art simulation method. The solute film height is a system variable of interest. Artifact 104 shown in FIG. 1C is a strong fluctuation close to the contact point of the droplet produced by the prior art simulation method.

What has not been developed is a system or method for modeling a droplet with a uniform evaporation rate that does not produce large artifacts. The present invention is directed towards providing such a method.

SUMMARY OF INVENTION

An embodiment of the present invention may be a system or method for simulating a physical process in a simulation domain. The physical process being simulated may be a droplet. The process being simulated may be the drying of a droplet on a substrate.

An embodiment of the present invention may include a computer-readable medium encoded with instructions for a processor to perform a method for simulating a droplet of a fluid on a substrate in a simulation domain.

The invention may include dividing the simulation domain into a first sub-domain and a gap region. The gap region defines a region of a specified width between a contact line of the droplet and the first sub-domain.

The invention may include generating a mesh that represents the first sub-domain as a plurality of elements. The specification of each element may include an integer element number that represents an order of each element. The specified width of the gap region may be on the order of half the width of an element in the first sub-domain adjoining the gap region divided by the integer element number of the element in the first sub-domain adjoining the gap region.

The finite element method and the mesh may be used to calculate a plurality of system variables indicative of a state of the droplet at a first point in time. A plurality of evolution equations that represent how the system variables vary over time may be used to calculate system variables indicative of the state of the droplet at a second point in time.

The plurality of system variables may include one or more functions from the set consisting of: a spatial function representative of the height of the droplet; and a solute concentration function that is representative of the concentration of solute in the droplet.

Each element in the mesh may be a Lagrangian element. On the order of as used to describe the width of the gap region means a multiple between 0.6 to 1.4. In other words, the specified width of the gap region may be between 0.3 and 0.7 times the width of an element in the first sub-domain adjoining the gap region divided by the integer element number of the element in the first sub-domain adjoining the gap region.

In an embodiment of the present invention, the evolution equations represent the evaporation of a droplet. The effect of evaporation is represented by a spatial function in which the evaporation rate is a non-zero value at the contact line of the droplet.

In an embodiment of the present invention the width of the elements in the sub-domain adjoining the gap varies, and the width of the gap varies along with the elements in the sub-domain adjoining the gap.

In an embodiment of the present invention a testing function is defined in terms of a ghost cell that extends from the retreated boundary to a region of space outside the contact line. Also a shape function is defined in terms of a portion of the ghost cell that extends from the retreated boundary to the contact line.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF PREFERRED EMBODIMENTS

The present invention relates to systems and method for simulating the evolution of an evaporating droplet on a surface. In an embodiment of the present invention the droplet may be produced using inkjet technology. The present invention may be used to simulate the evolution of droplets produced using other techniques without going beyond the spirit and scope of the present invention. In an embodiment of the present invention, the simulation of the final shape of the droplet can be repeated several times while adjusting the fluid properties of the droplet until a desired final shape is obtained.

The simulation of the final shape of the droplet may include evaluating one or more lubrication type differential equations. The lubrication type differential equations may include a fourth order height evolution equation. The fourth order height evolution equation may be rewritten as two second order equations. The lubrication equations may also include a solute convection equation. The solute convection equation may be first order in terms of the solute concentration, and is fourth order in terms of the height of the droplet.

Figure 1A:
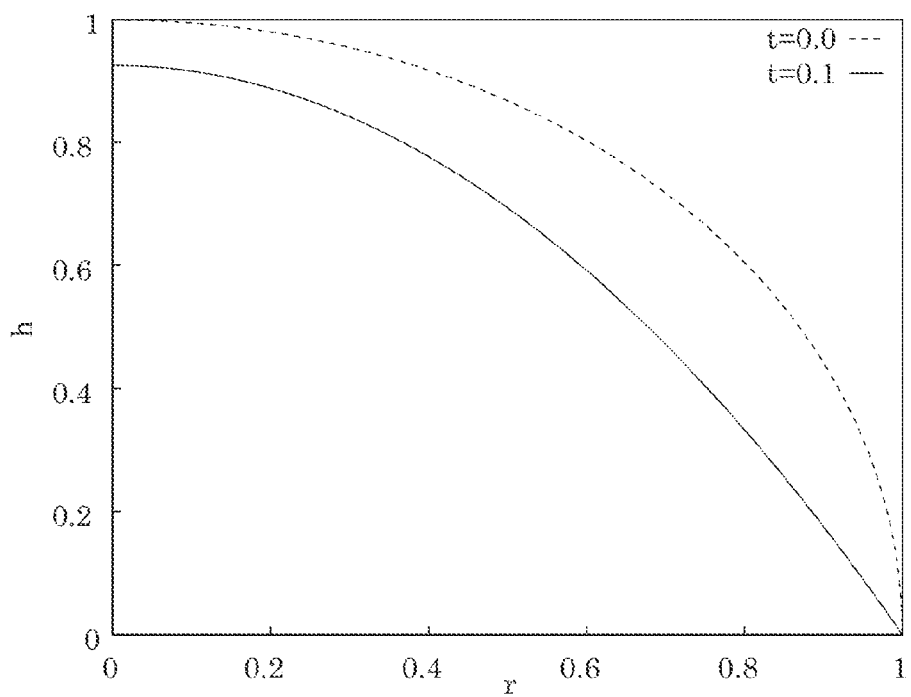
FIGS. 1A-C are simulation results of an evaporating droplet as produced by the prior art.
Figure 1B:
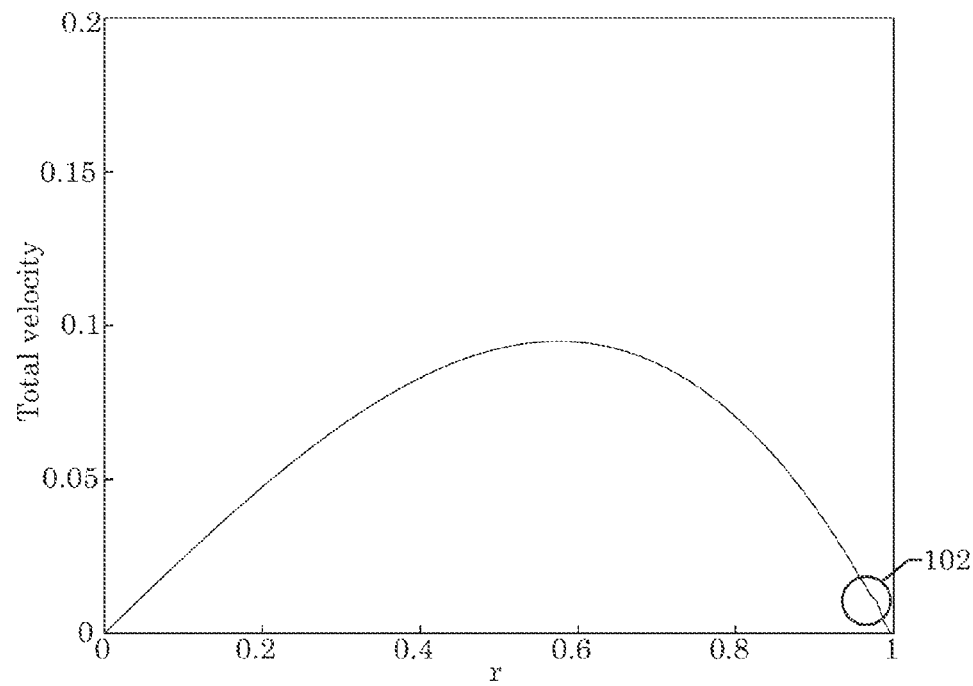
Figure 1C:
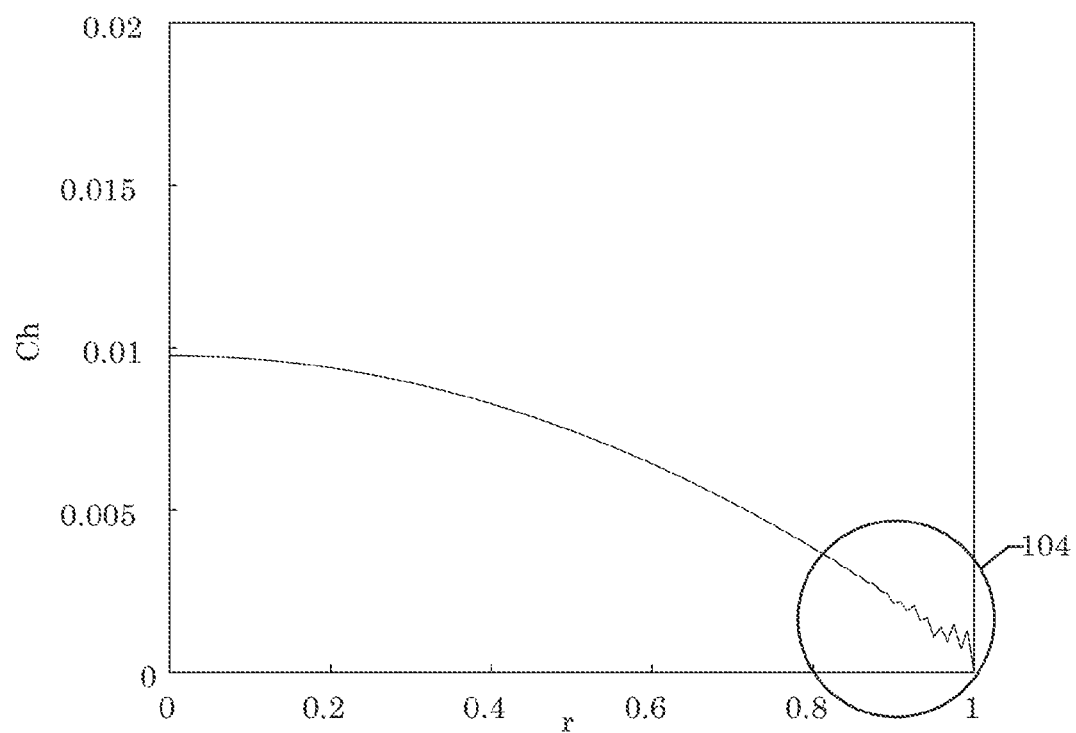
Figure 2A:
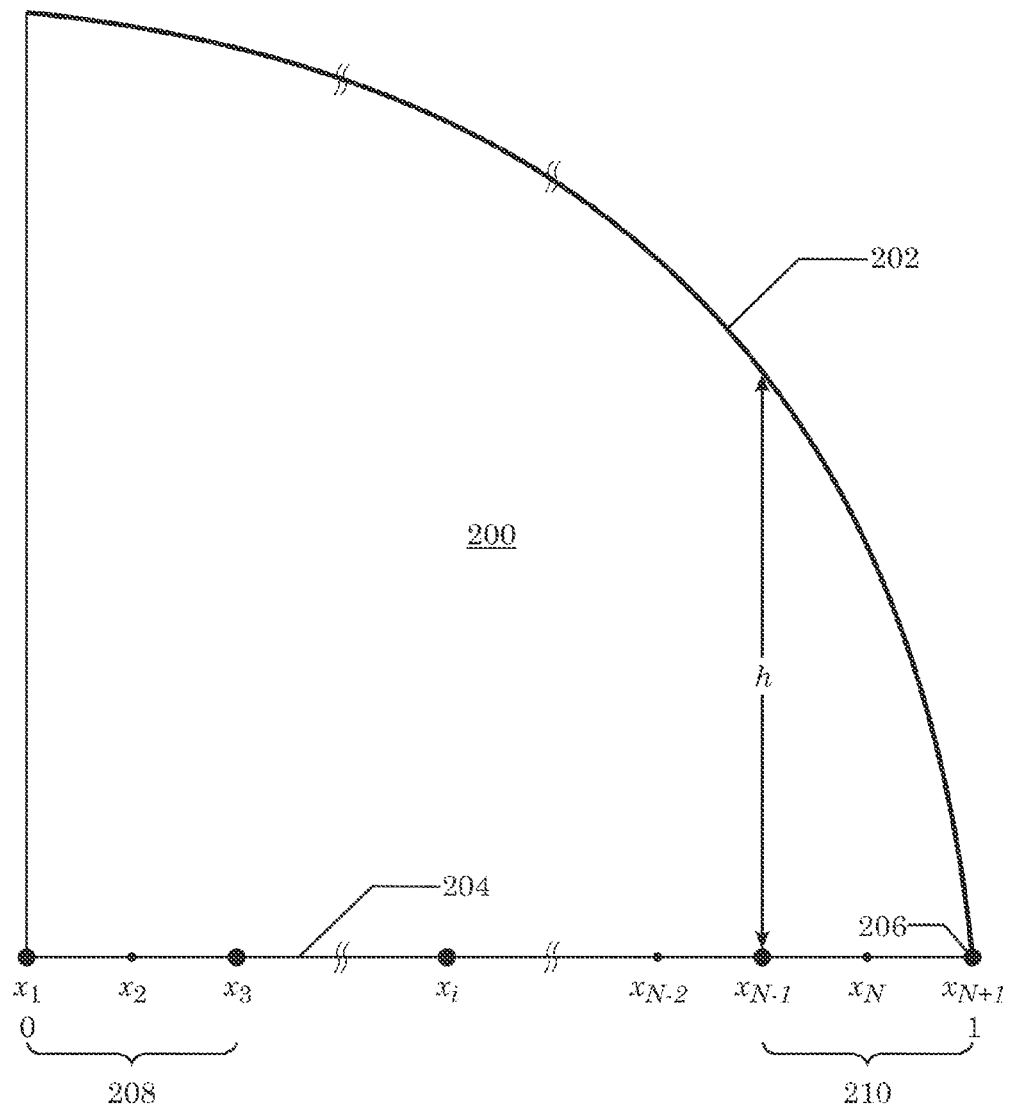
FIGS. 2A-B are illustrations of a symmetric domain in which the simulation domain has been reduced from three dimensions to one dimension along the radius of the droplet.

As illustrated in FIG. 2A, a droplet 200 may be described in terms of an interface 202 and the height (h) of the interface 202 above a substrate 204. In an embodiment of the present invention, radial symmetry may be used to reduce the dimensions of the simulation space. The interface 202 may intersect the substrate 204 at a pinched contact point 206. The pinched contact point 206, often described as a pinned or fixed contact point, does not move and is at fixed point in space. The contact point 206 may represent a contact line. In an embodiment of the present invention, the simulation space may be normalized to the range $\{0, 1\}$.

An embodiment of the present invention may use the Finite Element Method (FEM) to evaluate the lubrication type equations over time and space. Each element occupies a region of space, for example, a first element 208 and a last element 210 as shown in FIG. 2A may occupy a region of space defined by two end nodes and one central node. The elements may be distributed along the simulation space. As shown in FIG. 2A, an endpoint of the last element 210 coincides with the contact point 206.

Figure 2B:
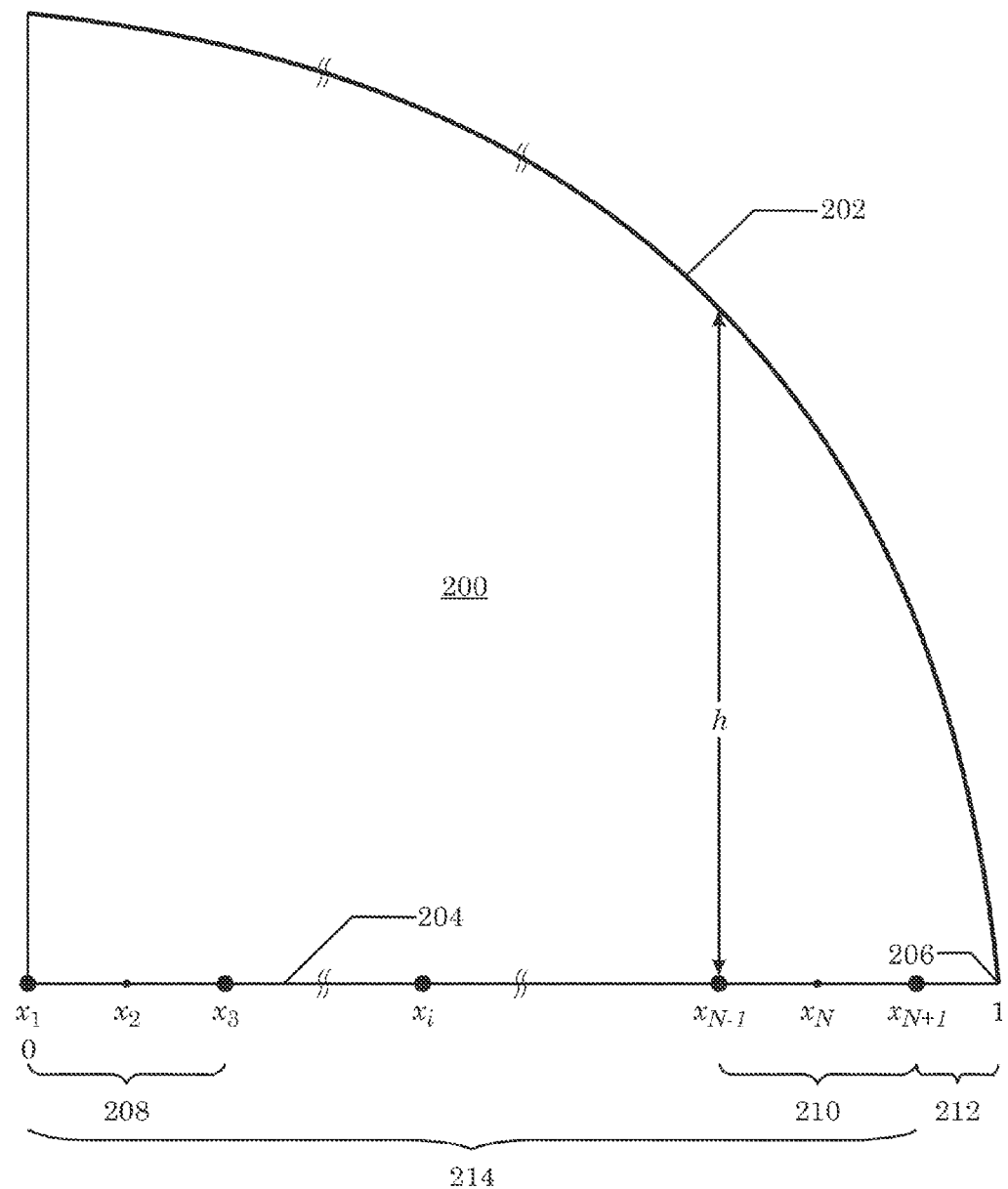

An embodiment of the present invention may make use of a judiciously retreated FEM to solve the lubrication equations as illustrated in FIG. 2B. The judiciously retreated FEM includes retreating a last nodal point of the last element 210 from the contact point 206. A gap 212 is left between a retreated meshed region 214 and the contact point 206. The retreated meshed region 214 is the region between the first element 208 and the last element 210. In an embodiment of the present invention the size of the gap 212 is between 0.3 and 0.7 times the node-to-node distance of the element nearest the gap. In an embodiment of the present invention the size of the gap 212 is ⅓ the node-node distance of the element nearest the gap. In an embodiment of the present invention the node-to-node distance is of the element closest to the gap 212. In an embodiment of the present invention, the elements are uniform. In an embodiment of the present invention, the elements are non-uniform.

Again the retreated mesh 214 covers only a part of the simulation domain leaving a gap 212 between the retreated meshed region and the domain boundary at the contact point 206. In an embodiment of the present invention, an approximate solution to the lubrication differential equations may be found by using a weak integral formulation of the differential equations. Using the weak form of the lubrication equations may include calculating integrals over each element. FIGS. 2A-B are illustrations of an axi-symmetric domain in which the simulation domain has been reduced from three dimensions to one dimension along the radius of the droplet. The height of the droplet is a simulation variable and is not a part of the simulation domain.

Governing Equations

The governing equations for the evaporation of a shallow droplet with a pinched contact line, based on the lubrication theory, may include a height evolution equation such as equation (1). The droplet profile may be described using height function h that is a function of two spatial dimensions (x, y) and time t. The effects of surface tension and viscosity within the droplet may be characterized in terms of a Capillary Number, $$Ca = \frac{\mu U}{\sigma}.$$

The Capillary Number Ca may be calculated from: the characteristic velocity of fluid in the droplet U; the dynamic viscosity of the fluid in the droplet $\mu$; and the surface tension coefficient of the fluid in the droplet $\sigma$. In an embodiment of the present invention the droplet evaporation rate J(x, y, t) may be a function of space and time. In an embodiment of the present invention, the droplet evaporation rate J(t) may be a function of time and uniform over spatial dimensions of the droplet. In an embodiment of the present invention the characteristic velocity of the fluid in the droplet U may be related to the initial evaporation rate $J_0$ of the droplet and the initial surface area of the droplet.

$$\frac{\partial h}{\partial t} + \frac{\partial}{\partial x}\left(\frac{h^3}{3Ca}\frac{\partial}{\partial x}\left(\frac{\partial^2 h}{\partial x^2}+\frac{\partial^2 h}{\partial y^2}\right)\right) + \frac{\partial}{\partial y}\left(\frac{h^3}{3Ca}\frac{\partial}{\partial y}\left(\frac{\partial^2 h}{\partial x^2}+\frac{\partial^2 h}{\partial y^2}\right)\right) = -J \quad (1)$$

The height evolution equation (1) is a fourth order differential equation which may be rewritten as two second order differential equations such as equations (2) and (3). Equation (2) is rewritten in terms of an intermediate variable p, which is a second order differential of the height function.

$$\frac{\partial h}{\partial t} + \frac{\partial}{\partial x}\left(\frac{h^3}{3Ca}\frac{\partial p}{\partial x}\right) + \frac{\partial}{\partial y}\left(\frac{h^3}{3Ca}\frac{\partial p}{\partial y}\right) = -J \quad (2)$$

$$p = \frac{\partial^2 h}{\partial x^2} + \frac{\partial^2 h}{\partial y^2}, \quad (3)$$

In an embodiment of the present invention, the governing equations may include a solute convection and diffusion equation such as equation (3).

$$\frac{\partial(hC)}{\partial t} + \frac{\partial}{\partial x}\left(\frac{h^3}{3Ca}\frac{\partial p}{\partial x}C\right) + \frac{\partial}{\partial y}\left(\frac{h^3}{3Ca}\frac{\partial p}{\partial y}C\right) = \quad (4)$$

$$\frac{\partial}{\partial x}\left(\frac{h}{Sc}\frac{\partial C}{\partial x}\right) + \frac{\partial}{\partial y}\left(\frac{h}{Sc}\frac{\partial C}{\partial y}\right)$$

The solute convection and diffusion equation describes how a product (hC) of the solute concentration (C) and the height (h) evolves over time. The diffusion of solute in the droplet may be characterized in terms of a Schmidt like number $$Sc = \frac{UL}{D}.$$

The Schmidt like number is the inverse of the diffusion coefficient D of the solute in the droplet scaled in terms of: the characteristic velocity of fluid in the droplet U; and the characteristic length of the droplet L. The boundary conditions include requiring that the height at the pinched contact line $\partial\Omega$ be zero, $h|_{d\Omega}=0$. The boundary conditions may also include requiring that the total velocity in the direction normal to the pinched contact line (where $\hat{n}$ is the unit normal to the pinched contact line) is zero as described by equation (5).

$$\left.\frac{h^3}{3Ca}(\nabla p \cdot \hat{n})\right|_{\partial\Omega} = 0 \quad (5)$$

The boundary conditions may also include requiring that the solute convection flux is zero at the contact line as described in equation (6).

$$\left.\frac{h^3}{3Ca}(\nabla p \cdot \hat{n})C\right|_{\partial\Omega} = 0 \quad (6)$$

The boundary conditions may also include requiring that the solute diffusion flux is zero at the contact line as described in equation (7).

$$h(\nabla C \cdot \hat{n})|_{\partial\Omega}=0 \quad (7)$$

The concentration variable C represents the concentration of the solute averaged over the height of the droplet. In addition, the height of the droplet is measured along a z-axis. Therefore, the partial derivative of the concentration C relative to the spatial coordinate z is zero, $$\frac{\partial C}{\partial z} = 0.$$

In addition, the intermediate variable p as described by equation (3) is also independent of the spatial coordinate z, $$\frac{\partial p}{\partial z} = 0.$$

The solute convection and diffusion equation (4) is coupled to the height evolution equation (2) in two ways. The solute concentration influences the evolution of droplet surface via the evaporation rate J, which may decrease when the solute concentration C goes up. The solute concentration C also influences the evolution of droplet surface via the dynamic viscosity μ, which increases when the solute concentration C goes up.

Three Dimensional Weak Form

Figure 3A:
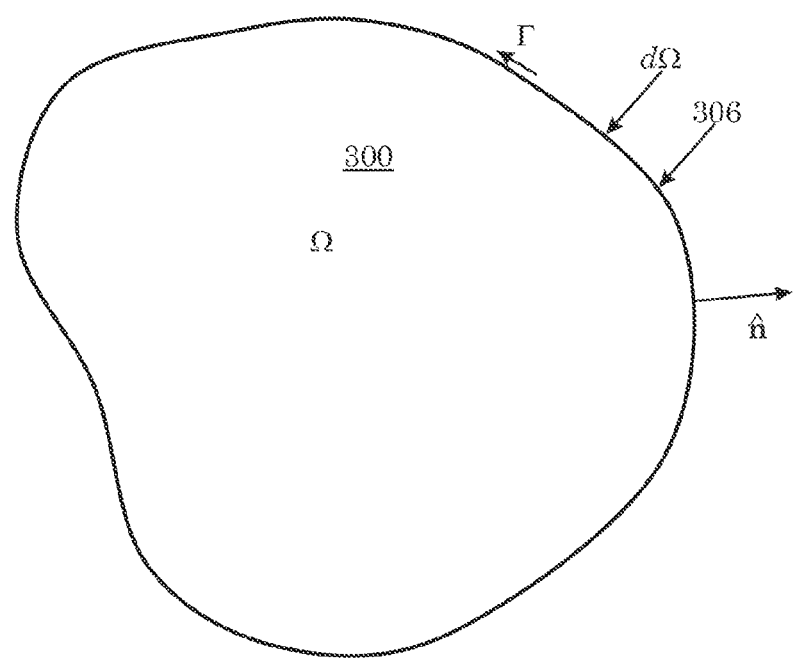
FIGS. 3A-D are illustrations of an asymmetric simulation domain in which an embodiment of the present invention is practiced.

FIG. 3A is an illustration of an asymmetric droplet 300. The simulation domain $\Omega$ of the asymmetrical droplet 300 is a two dimensional area that encompasses the extent of the droplet 300. The simulation domain $\Omega$ of the droplet is bounded by a pinched contact line $\partial\Omega$306. A symbol $\Gamma$ represents the line along the pinched contact line $\partial\Omega$306. A unit vector $\hat{n}$ is normal to the pinched contact line $\partial\Omega$306 and is pointing outward away from the droplet. In an embodiment of the present invention when the substrate upon which the droplet is resting is flat the unit vector $\hat{n}$ does not have a z component. In addition, the partial derivate of the height relative to the z-axis is zero.

Integration by parts may be used develop a weak form of equation (3) in terms of a testing function $\phi$ as shown in equation (8).

$$\int_\Omega \phi p\, dS = -\int_\Omega \nabla\phi \cdot \nabla h\, dS + \int_{\partial\Omega} \phi \frac{\partial h}{\partial \hat{n}}\, d\Gamma \quad (8)$$

The weak form of equations (2), and (4) may be written as equations (9), and (10), in which $\phi$ is a testing function.

$$\int_\Omega \frac{\partial h}{\partial t}\phi\, dS - \int_\Omega \frac{h^3}{3Ca}\nabla\phi \cdot \nabla p\, dS = -\int_\Omega J\phi\, dS \quad (9)$$

-continued $$\int_\Omega \frac{\partial (hC)}{\partial t} \phi dS - \int_\Omega \nabla \phi \cdot \left( \frac{h^3}{3Ca} \nabla p \right) C dS = -\int_\Omega \nabla \phi \cdot \left( \frac{h}{Sc} \nabla C \right) dS \quad (10)$$

Temporal Discretization

In an embodiment of the present invention initial conditions at a time step $n(t^n)$ may be known and represented as $h^n$, $p^n$, $C^n$. An embodiment of the present invention may include a system or method for estimating system variables $h^{n+1}$, $p^{n+1}$, and $C^{n+1}$ at a time step $n+1(t^{n+1}=t^n+\Delta t)$. An embodiment of the present invention may include performing the estimate repeatedly to form a time series of system variables. Equation (11) describes a method of representing the relationship between $p^{n+1}$ and $h^{n+1}$.

$$\int_\Omega \phi p^{n+1} dS = -\int_\Omega \nabla \phi \cdot \nabla h^{n+1} dS + \oint_{\partial \Omega} \phi \frac{\partial h^{n+1}}{\partial \hat{n}} d\Gamma \quad (11)$$

The temporal partial derivative in equation (9) may be discretized as described in equation (12).

$$\int_\Omega \frac{h^{n+1} - h^n}{\Delta t} \phi dS - \int_\Omega \frac{(h^n)^3}{3Ca} \nabla \phi \cdot \nabla p^{n+1} dS = -\int_\Omega J \phi dS \quad (12)$$

Note that equation (12) is semi-implicit. The applicant has found that using a semi-implicit formulation of the following type provides stable results. The height variable h in the second term is calculated at a first time step n, and intermediate variable p is calculated at a future time step n+1. The intermediate variable p may be calculated based on the height h using equation (11).

The temporal partial derivative in equation (10) may be discretized as described in equation (13).

$$\int_\Omega \frac{h^{n+1}C^{n+1} - h^n C^n}{\Delta t} \phi dS - \int_\Omega \nabla \phi \cdot \left[ \frac{(h^{n+1})^3}{3Ca} \nabla p^{n+1} \right] C^{n+1} dS = -\int_\Omega \nabla \phi \cdot \left( \frac{h^{n+1}}{Sc} \nabla C^{n+1} \right) dS \quad (13)$$

Note that the only unknown in equation (13) is $C^{n+1}$ the rest of the variables may be calculated from equations (11) and (12) and the past time step. Also note that the variables in the second and third integrals are calculated at the future time step n+1 instead of the present time step n.

Spatial Algorithm—3D Judiciously Retreated FEM

In an embodiment of the present invention the finite element method (FEM) may be used to evaluate equations (11)-(13) as described by equations (14)-(16).

$$\int_\Omega \phi_i \sum_{j=1}^{NP} p_j^{n+1} \phi_j dS = \quad (14)$$
$$-\int_\Omega \nabla \phi_i \cdot \left( \sum_{j=1}^{NP} h_j^{n+1} \nabla \phi_j \right) dS + \oint_{\partial \Omega} \phi_i \sum_{j=1}^{NP} h_j^{n+1} \frac{\partial \phi_j}{\partial \hat{n}} d\Gamma$$

$$\int_\Omega \phi_i \left[ \sum_{j=1}^{NP} (h_j^{n+1} - h_j^n) \phi_j \right] dS - \quad (15)$$
$$\int_\Omega \frac{\Delta t}{3Ca} \left( \sum_{k=1}^{NP} h_k^n \phi_k \right)^3 \nabla \phi_i \cdot \left( \sum_{j=1}^{NP} p_j^{n+1} \nabla \phi_j \right) dS = -\Delta t \int_\Omega \phi_i \sum_{j=1}^{NP} J_j \phi_j dS$$

$$\int_\Omega \phi_i \left[ \left( \sum_{k=1}^{NP} h_k^{n+1} \phi_k \right) \left( \sum_{j=1}^{NP} C_j^{n+1} \phi_j \right) - \left( \sum_{k=1}^{NP} h_k^n \phi_k \right) \left( \sum_{j=1}^{NP} C_j^n \phi_j \right) \right] dS - \quad (16)$$
$$\int_\Omega \nabla \phi_i \cdot \left[ \frac{\Delta t}{3Ca} \left( \sum_{k=1}^{NP} h_k^{n+1} \phi_k \right)^3 \left( \sum_{l=1}^{NP} p_l^{n+1} \nabla \phi_l \right) \right] \sum_{j=1}^{NP} C_j^{n+1} \phi_j dS = $$
$$-\int_\Omega \nabla \phi_i \cdot \left[ \frac{\Delta t}{Sc} \left( \sum_{k=1}^{NP} h_k^{n+1} \phi_k \right) \left( \sum_{j=1}^{NP} C_j^{n+1} \nabla \phi_j \right) \right] dS$$

Figure 3B:
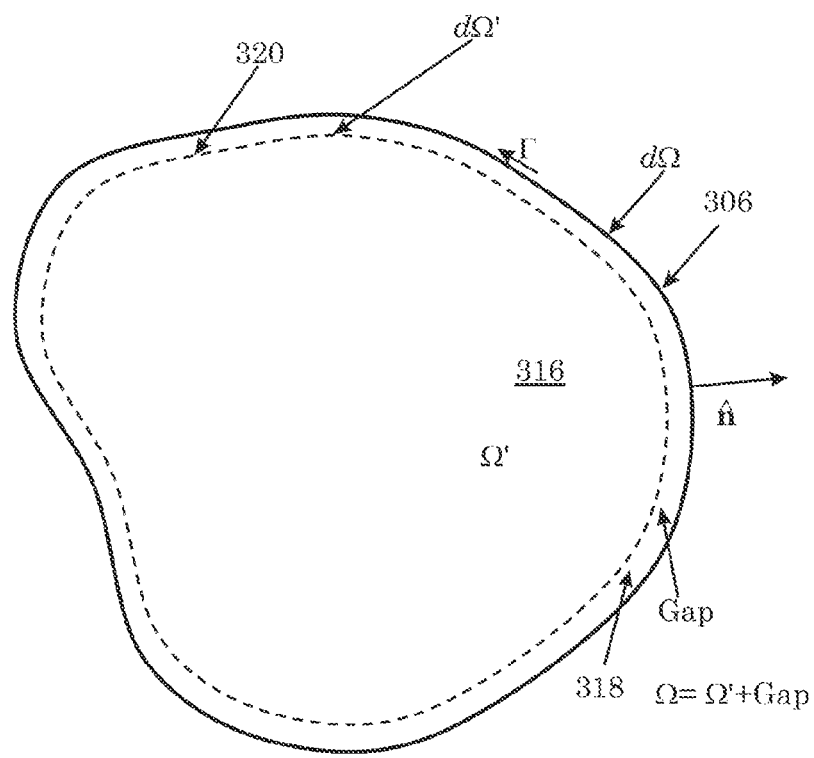

As described by equations (14)-(16) there are NP finite element nodes in the simulation space $\Omega$. The simulation space may be an arbitrary shape as shown in FIGS. 3A-B. In an embodiment of the present invention the NP finite element nodes form a mesh that represents most of the space occupied by the droplet.

As shown in FIGS. 3A-3B, the simulation domain 300 $\Omega$ occupied by the evaporating droplet is enclosed by the pinched contact line 306 $\partial \Omega$. The finite element mesh covers a sub-domain 316 $\Omega'$ that is bounded by a judiciously retreated boundary 320 $\partial \Omega'$. Since sub-domain 316 $\Omega'$ is slightly smaller than simulation domain 300 $\Omega$, there is a gap 318 between the judiciously retreated boundary 320 $\partial \Omega'$ and the pinched contact line 306 $\partial \Omega$. Thus, the simulation domain is divided into two sub-domains as described by equation (17).

$$\Omega = \Omega' + \text{gap} \quad (17)$$

The applicant has found that if the gap 318 is too small relative to the size of the regular elements in sub-domain 316 $\Omega'$ then the simulation method can be unstable. The applicant has also found that if the gap 318 is large relative to the size of the regular elements then the simulation method can be inaccurate. The gap 318 is on the order of one half of the node-to-node distance of elements right next to gap 318. In the context of the present application on the order of one half means between 0.3 and 0.7. It is noted that, the width of gap 318 may be much smaller than the size of a regular element, depending on the type of regular element used. For example, if the regular element in the meshed region is a first-order Lagrangian element (e.g., a quadrilateral element defined by four corner nodes), the width of gap 318 is about one half of the regular element width, as measured in the same direction as the width of the gap 318. If the regular element in the meshed part is a 3rd-order Lagrangian element (e.g., a quadrilateral element defined by 16 nodes), the width of gap 318 will be about one sixth of the regular element width, as measured in the same direction as the width of the gap 318. The width of the gap is on the order of one half of, one $$m\text{-}th\left(\frac{1}{2m}\right)$$

of the width of the element near the gap 318, where m is the order of the Lagrangian element nearest the gap 318.

Figure 3C:
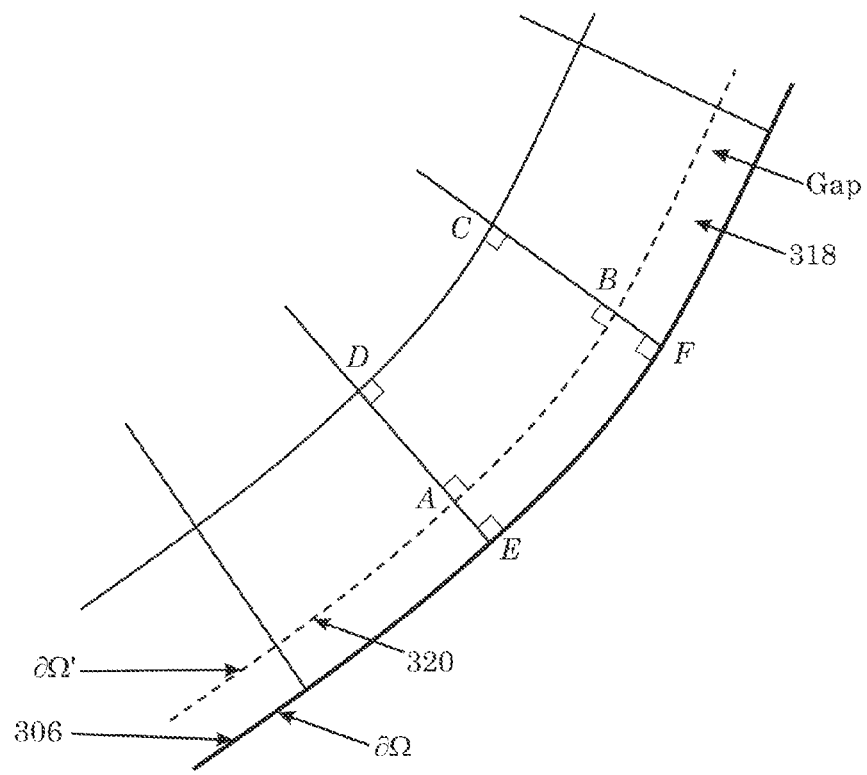

The applicant has found that it simplifies the implementation of the present invention if the elements in sub-domain 316 Ω' and next to the retreated boundary 320 ∂Ω' are quadrilateral elements with internal angles that are between 75° and 105° as shown in FIG. 3C. In an embodiment of the present invention some of the elements are triangular and some of the elements are quadrilateral. In an embodiment of the present invention, the elements next to the gap are quadrilateral while other elements are not quadrilateral.

Prior art mesh generators or finite element code are not capable of utilizing a judiciously retreated finite element mesh that only covers sub-domain 316 Ω'. The typical finite element problem is defined in terms of a simulation domain boundary 306 ∂Ω'. There is no provision in prior art mesh generators to build a mesh that is retreated from the boundary.

An embodiment of the present invention may overcome this limitation of the prior art by first generating a mesh that covers the whole simulation domain 300 Ω. In an embodiment of the present invention, the mesh cells next to the domain boundary 306 ∂Ω are quadrilateral. Those mesh cells next to the domain boundary 306 ∂Ω are then retreated by a first distance normal to the boundary. The first distance is on the order of one half of, one $$m\text{-}th\left(\frac{1}{2m}\right)$$

of the width of those mesh cells right next to the simulation domain boundary 306 ∂Ω, where m is an integer number that represents the order of the Lagrangian element being retreated. For example, as shown in FIG. 3C, the solid lines show the regular first-order Lagrangian elements generated using a commercial or public domain mesh generator. FIG. 3C is an illustration of a portion of domain boundary 306 ∂Ω. An exemplary mesh cell located next to the boundary may be identified by its nodes DEFC. An edge $\overline{EF}$ of the cell DEFC is located on the domain boundary 306 ∂Ω. The regular mesh may be generated such that the cells adjoining the domain boundary 306 ∂Ω are quadrilateral. In an embodiment of the present invention grid lines, such as those along edges $\overline{DE}$ and $\overline{CF}$, are close to perpendicular with domain boundary 306 ∂Ω. For example, the edge $\overline{EF}$ of cell DEFC is retreated to edge $\overline{AB}$ forming new edges as described by equations (18) and shown in FIG. 3C.

$$\overline{BF} \approx \frac{1}{2m}\overline{CB} \quad \overline{AE} \approx \frac{1}{2m}\overline{DA} \tag{18}$$
$$\overline{BF} \approx \frac{o}{m}\overline{CB} \quad \overline{AE} \approx \frac{o}{m}\overline{DA} \quad 0.3 \le o \le 0.7$$

The boundary integral in equation (14) is evaluated along the domain boundary 306 ∂Ω, while the other volume integrals in equations (14), (15), and (16) are separated into two parts as described by equation (19). The first term on the right hand side of equation (19) is an integral in the meshed part of the sub-domain 316 Ω', which may be handled using the conventional finite element method. The second term on the right hand side of equation (19) needs to be evaluated carefully because the testing function φ and the shape of the unknown functions h, p, and C are not defined in the gap region 318.

$$\int_\Omega dS = \int_{\Omega'} dS + \int_{Gap} dS \tag{19}$$

The second term in equation (15) may be described using equation (20).

$$\int_\Omega \frac{\Delta t}{3Ca}\left(\sum_{k=1}^{NP} h_k^n \phi_k\right)^3 \nabla \phi_i \cdot \left(\sum_{j=1}^{NP} p_j^{n+1} \nabla \phi_j\right) dS = \tag{20}$$
$$\int_{\Omega'} \frac{\Delta t}{3Ca}\left(\sum_{k=1}^{NP} h_k^n \phi_k\right)^3 \nabla \phi_i \cdot \left(\sum_{j=1}^{NP} p_j^{n+1} \nabla \phi_j\right) dS +$$
$$\int_{Gap} \frac{\Delta t}{3Ca}\left(\sum_{k=1}^{NP} h_k^n \psi_k\right)^3 \nabla \phi_i \cdot \left(\sum_{j=1}^{NP} p_j^{n+1} \nabla \psi_j\right) dS$$

In general, when the conventional finite element method is used the testing function and the shape function are identical. In an embodiment of the present invention the testing function and the shape function are different in the gap region 318 as shown in equation (20). In the sub-domain 316 Ω' the shape function and the testing function are identified using the Greek letter φ. In the gap region 318 the testing function is identified using the Greek letter φ and the shape function is identified with the Greek letter ψ as exemplified in equation (20).

The following describes how to estimate functions, in terms of a first order Lagrangian element with four nodes, which represent: the height of the droplet h; the intermediate variable p; and the concentration of solute C. An individual skilled in the art will appreciate how to extend the present invention to higher order and/or non-Lagrangian elements.

Figure 3D:
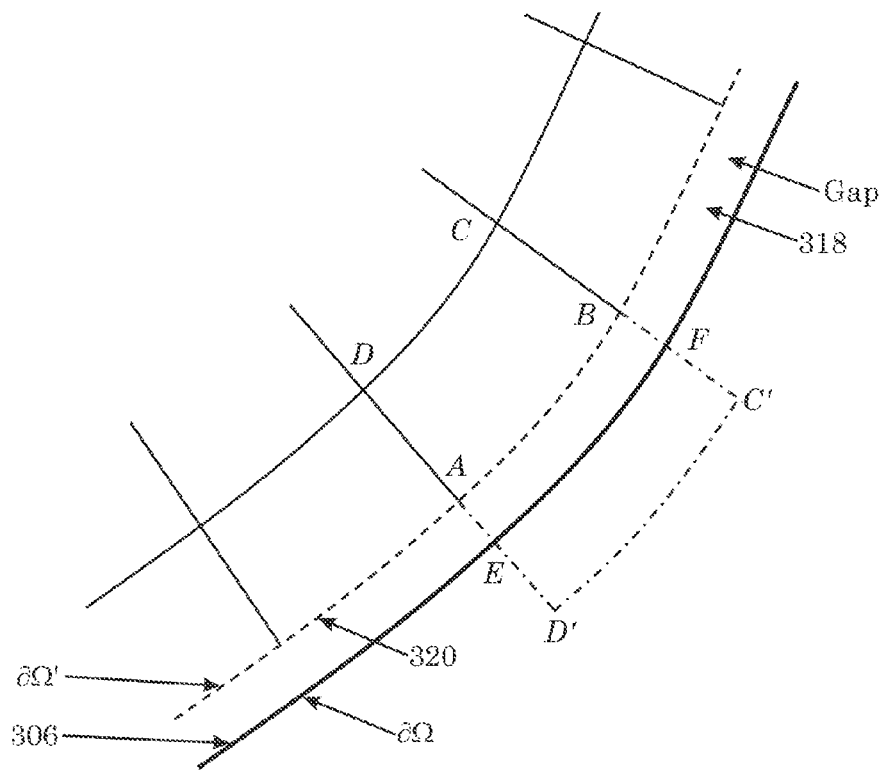

As shown in FIG. 3D the element ABCD includes an edge $\overline{AB}$ that coincides with retreated boundary 320 ∂Ω'. The edge lines $\overline{CB}$ and $\overline{DA}$ can be extended across the pinched contact line, i.e. the domain boundary 306 ∂Ω, to nodes C' and D' as shown in FIG. 3D. The extended lines intersect the domain boundary 306 ∂Ω at nodes F and E. In an embodiment of the present invention, a testing function φ may be defined in an element AEFB. For a linear Lagrangian element the edges $\overline{BF}$ and $\overline{AE}$ are each about one half the lengths of $\overline{CB}$, and $\overline{DA}$. The ghost points C' and D' are outside of the simulation domain Ω. The testing function φ in AEFB may be created by first generating a ghost cell AD'C'B such that width of the ghost cell is equal to the width of the adjacent cell as described in equation (21) as shown in FIG. 3D.

$$|\overline{BC'}|=|\overline{CB}| \quad |\overline{AD'}|=|\overline{DA}| \tag{21}$$

The testing function φ is than constructed in the ghost cell using the finite element method. The testing functions φ is nonzero except at the edges of ghost cell AD'C'B. Only testing function values φ in the cell AEFB are needed in an implementation of the present invention. The testing function associated with node A$\phi_A$ may be 1 at node A and may smoothly decrease to zero at nodes B, C' and D'. The testing function associated with node A$\phi_A$ has a non-zero value at the contact line ∂Ω306. The testing functions for node B may be similarly defined. The testing function φ may be a bilinear function, a higher order polynomial, a transcendental function, or some other combination thereof.

Calculating the droplet height h in the gap region 318 may be done using interpolation. In an embodiment of the present invention linear interpolation may be used to calculate various system variables including the height of the droplet. The shape functions $\psi_A$, $\psi_B$, $\psi_E$, and $\psi_F$ are associated with nodes A, B, E, and F. Unlike prior art methods, the shape function associated with node A $\psi_A$ is defined over a more limited range than the testing function $\phi_A$. The shape function is defined over just the gap region as opposed to the ghost cell over which the testing function is defined. Likewise the heights of the droplet $h_A$, $h_B$, $h_E$, and $h_F$, are associated with each of the corresponding nodes. Equation (22) describes how linear interpolation may be used to calculate the height within cell AEFB.

$$h(\vec{x}) = h_A\psi_A + h_B\psi_B + h_E\psi_E + h_F\psi_F \quad (22)$$

In accordance with the boundary condition, $h|_{\partial\Omega}=0$ and the requirement that nodes E and F are on domain boundary 320 $\partial\Omega$ it is reasonable to state that $h_E$ and $h_F$, are zero. Thus equation (22) may be reduced to equation (23).

$$h(\vec{x}) = h_A\psi_A + h_B\psi_B \quad (23)$$

Equation (24) describes how linear interpolation may be used to calculate the intermediate variable p within the cell AEFB. Other interpolation methods may be used without going beyond the scope and spirit of the present application.

$$p(\vec{x}) = p_A\psi_A + p_B\psi_B + p_E\psi_E + p_F\psi_F \quad (24)$$

As before the variables $p_A$, $p_B$, $p_E$, and $p_F$ are representatives of the intermediate value p at nodes A, B, E, and F. Since nodes E and F are not in the sub-domain 316 $\Omega'$ the intermediate variables $p_E$ and $p_F$ are not calculated directly. In an embodiment of the present invention, a boundary condition for intermediate variable p may not be defined. The values of the intermediate variables p at the domain boundary $\partial\Omega$306 may be calculated using linear extrapolation from nearby nodes as described by equations (25). Higher order or other extrapolation methods may be used without going beyond the scope and spirit of the present invention.

$$p_E = \alpha p_A + \beta p_D$$
$$p_F = \alpha p_B + \beta p_C \quad (25)$$
$$\alpha = \frac{|\overline{AE}|}{|\overline{DA}|} + 1 \quad \beta = 1 - \alpha$$

Note that the variables α and β are calculated based on the relative lengths of the edges near node E. In an embodiment of the present invention the relative lengths of edges near node E are similar or identical to the relative lengths of the edges near node F. In an individual skilled in the art would appreciate how to modify equation (25) to handle cells in which the relative lengths of edges near node E are not similar to the relative lengths of the edges near node F.

Equation (26) describes how linear interpolation may also be used calculate the concentration of solute C within the cell AEFB. Other interpolation methods may be used without going beyond the scope and spirit of the present application.

$$C(\vec{x}) = C_A\psi_A + C_B\psi_B + C_E\psi_E + C_F\psi_F \quad (26)$$

As before the variables $C_A$, $C_B$, $C_E$, and $C_F$ are representative of the concentration of solute C at nodes A, B, E, and F. Since nodes E and F are not in the sub-domain 316 $\Omega'$ the concentration of solute $C_E$ and $C_F$ are not calculated directly. In an embodiment of the present invention, a boundary condition for concentration of solute C may not be defined. The values of the concentration of solute C at the domain boundary $\partial\Omega$ 306 may be calculated using linear extrapolation from nearby nodes as described by equations (27). Higher order or other extrapolation methods may be used without going beyond the scope and spirit of the present invention.

$$C_E = \alpha C_A + \beta C_D$$
$$C_F = \alpha C_B + \beta C_C \quad (27)$$

In a physically accurate simulation of a droplet the solute concentration is always less than or equal to 1. When the concentration of the solute C is equal to one that means that the solution is 100% solute and there is no solvent. An embodiment of the present invention would limit the concentration to a critical value $C_g$ called the gelation concentration. Once the gelation concentration has been reached, $C=C_g$, the solution becomes gel like and viscosity is so high that the solvent within the droplet ceases to flow significantly. In an embodiment of the present invention, the simulation is stopped at specific points once the gelation concentration at those points has been reached. Equation (28) describes a method of limiting concentration of solute within the gap region 318 to the gelation concentration.

$$C_E = \min[C_g, \alpha C_A + \beta C_D]$$
$$C_F = \min[C_g, \alpha C_B + \beta C_C] \quad (28)$$

The second integral in equation (20) may be equated to a series of integrals over cells (such as AEFB) in the gap region as described by equation (29). Equations (23)-(25) have been substituted into equation (20). Similar substitutions may be done to other cells in the gap region 318.

$$\int_{Gap} \frac{\Delta t}{3Ca} \left(\sum_{k=1}^{NP} h_k^n \psi_k\right)^3 \nabla\phi_i \cdot \left(\sum_{j=1}^{NP} p_j^{n+1} \nabla\psi_j\right) dS = \quad (29)$$

$$\int_{AEFB} \frac{\Delta t}{3Ca} (h_A^n\psi_A + h_B^n\psi_B)^3 \nabla\phi_i \cdot \begin{bmatrix} p_A^{n+1}\nabla\psi_A + p_B^{n+1}\nabla\psi_B + \\ (\alpha p_A^{n+1} + \beta p_D^{n+1})\nabla\psi_E + \\ (\alpha p_B^{n+1} + \beta p_C^{n+1})\nabla\psi_F \end{bmatrix} dS$$

+Integrations over other cells similar to AEFB along the gap.

Equation (30) describes how a portion of the integrand of the boundary integral in equation (14) may be evaluated along the domain boundary 306 $\partial\Omega$ of cell AEFB.

$$\sum_{j=1}^{NP} h_j^{n+1} \frac{\partial \phi_j}{\partial \hat{n}} = h_B^{n+1} \frac{\partial \psi_B}{\partial \hat{n}} + h_A^{n+1} \frac{\partial \psi_A}{\partial \hat{n}} \quad (30)$$

Please note that equation (30) takes into account the boundary conditions $h_E^{n+1} = h_F^{n+1} = 0$. Hence the last term of equation (14) may be evaluated using equation (31).

$$\oint_{\partial\Omega}\phi_i\sum_{j=1}^{NP}h_j^{n+1}\frac{\partial\phi_j}{\partial\hat{n}}d\Gamma=\oint_{EF}\phi_i\left(h_B^{n+1}\frac{\partial\psi_B}{\partial\hat{n}}+h_A^{n+1}\frac{\partial\psi_A}{\partial\hat{n}}\right)d\Gamma+ \quad (31)$$

Integrations over other segments similar to $\overline{EF}$ along $d\Omega$

Prior art implementations of the Finite Element Method have defined the shape function and the testing function over the range of each element in the simulation. Ghost cells are defined in such a manner that they overlap the boundary. The simulation boundary may coincide with the contact line. In an embodiment of the present invention the testing function is defined over a ghost cell and the shape function is defined over the gap region. The gap region is a limited portion of the ghost cell and is defined in terms of the simulation boundary. The simulation boundary divides the ghost cell into two regions: the gap region; and the rest of the ghost cell that is outside of the simulation space.

Numerical Example

FIGS. 4A-D are illustrations of the results of a numerical simulation performed by an embodiment of the present invention. In the numerical simulation a semi-spherical droplet with a radius of 1 (r=1) is sitting on a flat substrate and has an initial uniform solute concentration of 0.01 (C=0.01). In the numerical simulation the initial capillary number is Ca=3× $10^{-7}$. As the solute concentration increases, so does the viscosity and the capillary number. Equation (32) is an exemplary model of how the capillary number changes with concentration which is used in the numerical example. In the numerical simulation the gelation concentration is 0.5 ($C_g$=0.5). Equation (32) describes a system in which the capillary number increases sharply when the solute concentration approaches the gelation concentration. Other models for the capillary number may be used without going beyond the scope and spirit of the present application.

$$Ca=\frac{3\times10^{-7}}{1-\left(\frac{C}{C_g}\right)^{10}} \quad (32)$$

In the numerical simulation, the initial evaporation rate is uniform in space ($J_0$=0.5). Equation (33) describes how the evaporation rate changes with concentration. As described in equation (33) evaporation stops once the concentration reaches the gelation concentration. Other evaporation models may be used without going beyond the scope and spirit of the present invention.

$$J=\begin{cases}0.5\left(1-\frac{C}{C_g}\right) & \text{if } C\leq C_g\\ 0 & \text{if } C>C_g\end{cases} \quad (33)$$

In the illustrated numerical simulation the inverse of the Schmidt like number is 0.001 (1/Sc=0.001).

Figure 4A:
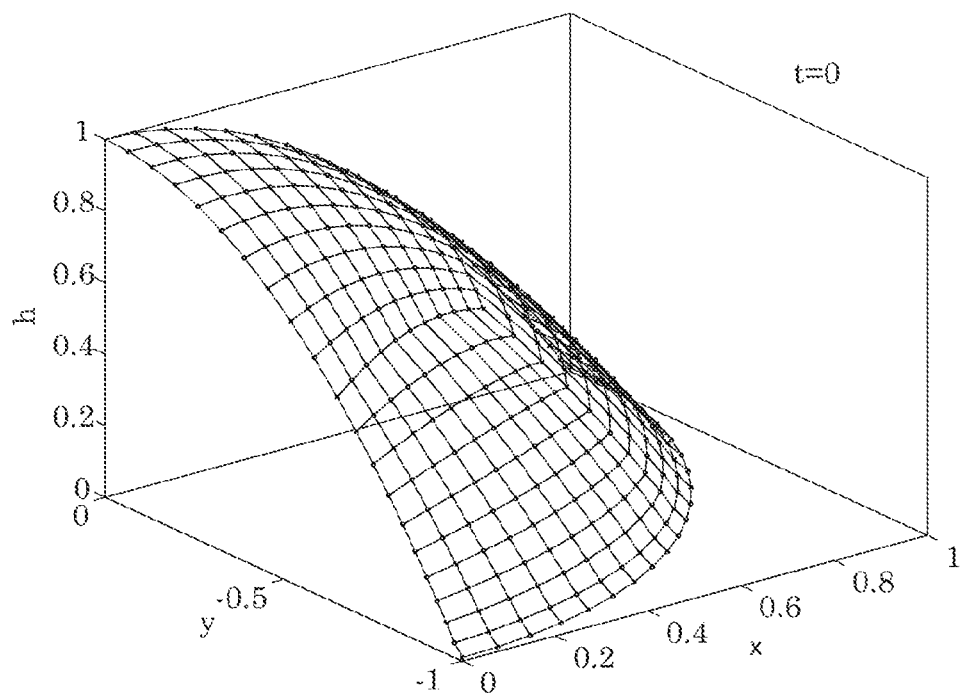
FIGS. 4A-4E are illustrations of the results of a simulation as described by an embodiment of the present invention.
Figure 4B:
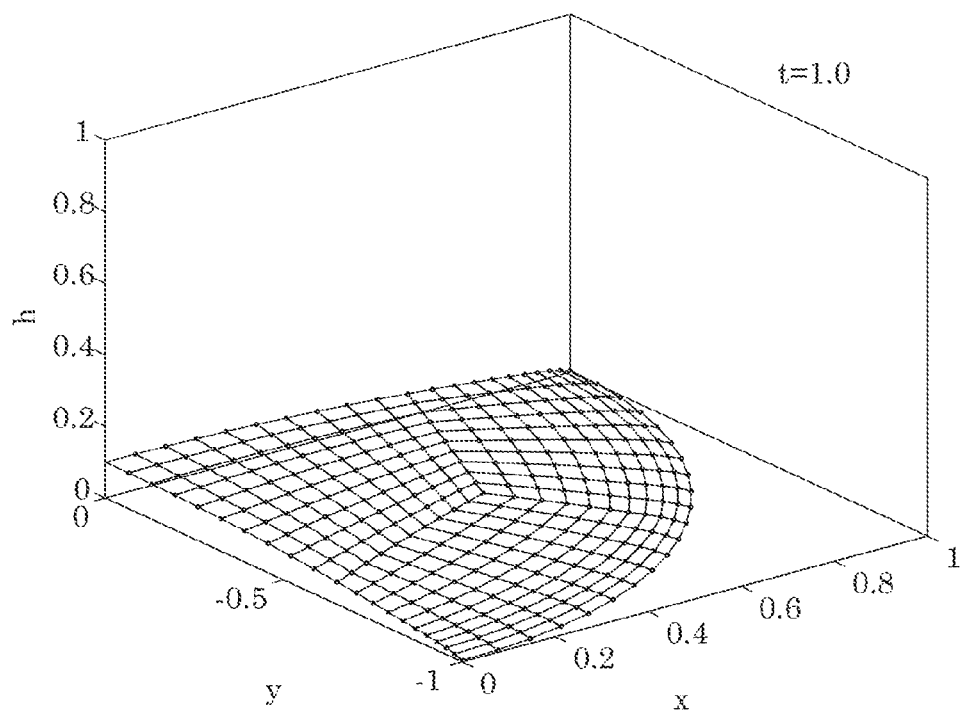
Figure 4C:
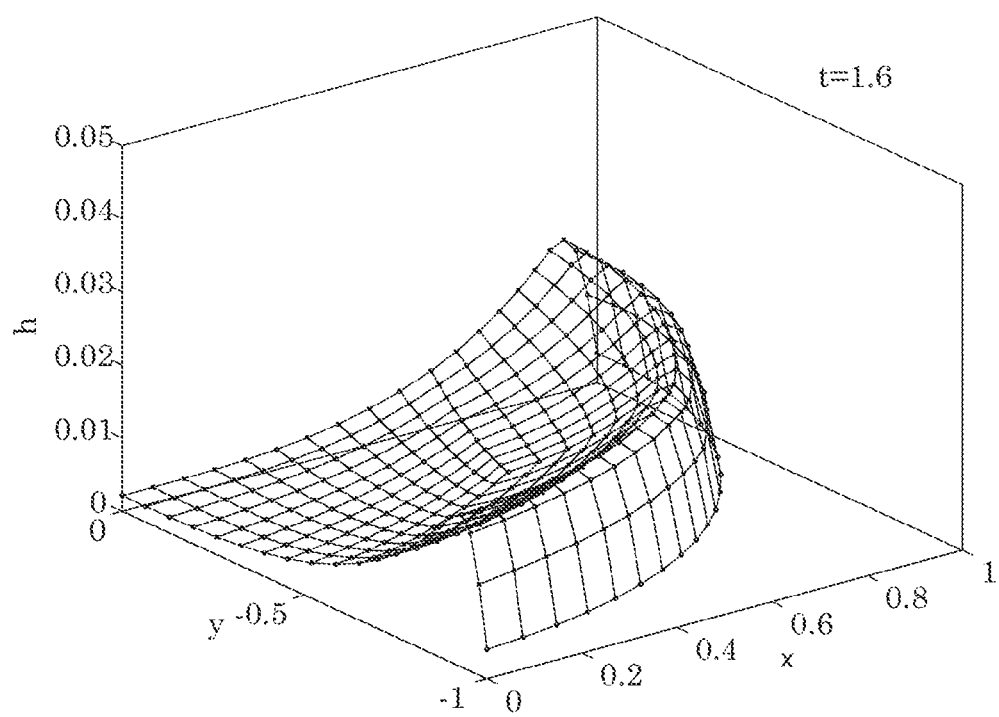
Figure 4D:
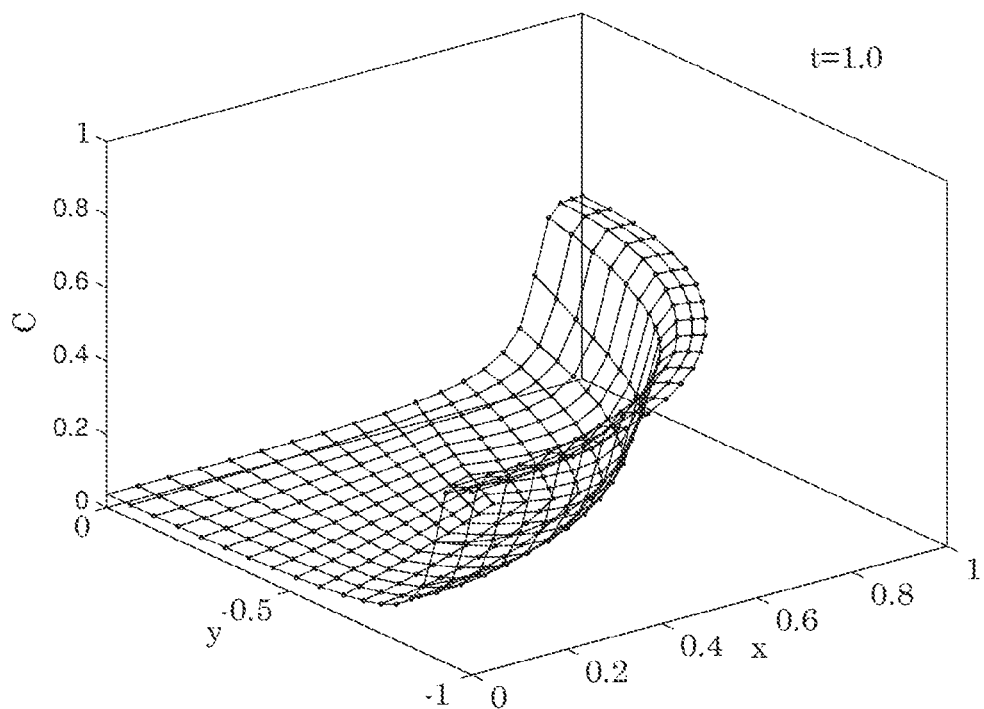
Figure 4E:
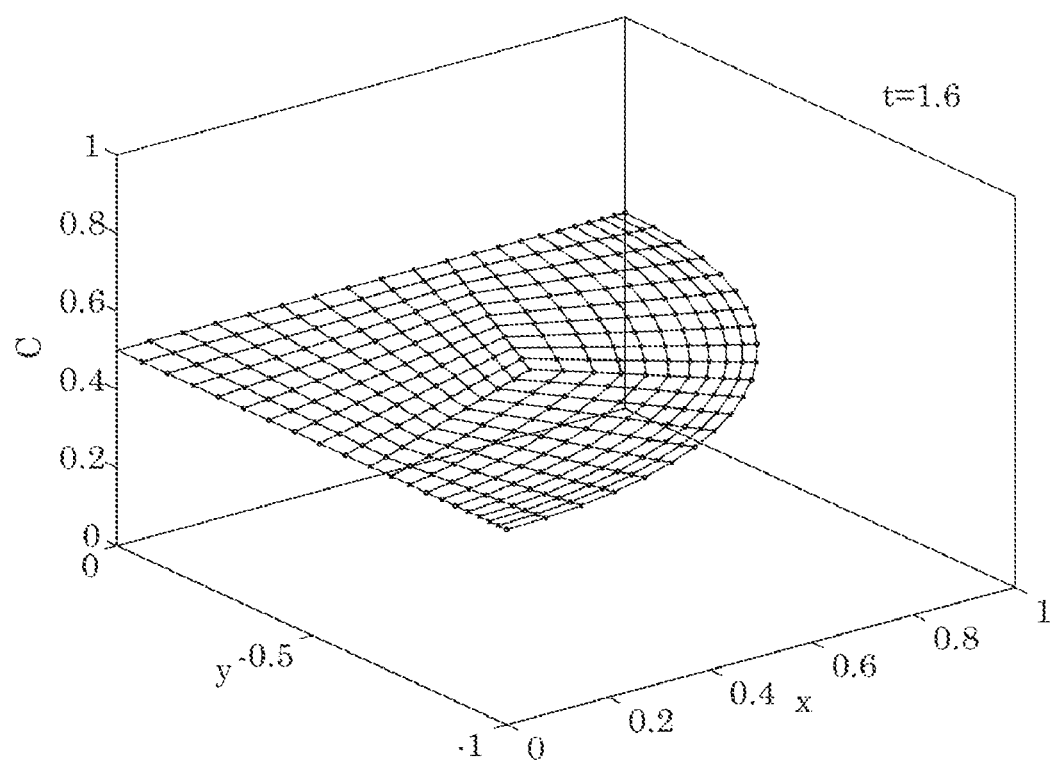

In the illustrated numerical simulation a mesh was generated. The mesh is a first-order Lagrangian type finite element model with 300 elements and 331 nodes. The judiciously retreated finite element mesh was created by retreating the mesh boundary by approximately half a mesh size. The initial shape of the droplet is illustrated in FIG. 4A. The droplet height at t=1.0 is illustrated in FIG. 4B and the droplet height at t=1.6 is illustrated in FIG. 4C. The solute concentration at t=1.0 is illustrated in FIG. 4D and the solute concentration at t=1.6 is illustrated in FIG. 4E. Please note that the mesh illustrated in FIGS. 4A-4E does not include the gap region.

As illustrated in FIGS. 4A-E the results of numerical simulation are smooth. Once the evaporation starts, evaporation and surface tension induce fluid to flow towards the domain boundary 306 $\partial\Omega$. The solute concentration close to the domain boundary 306 $\partial\Omega$ rises towards the gelation concentration as shown in FIG. 4D. As the concentration increases, the evaporation rate decreases, and the fluid viscosity increases. As shown in FIGS. 4B and 4D, at t=1.0, about 90% of the solvent has evaporated. Once the solute concentration reaches the gelation concentration, the solution ceases to flow and the evaporation rate at the surface is zero. At t=1.0 the concentration at the center of the droplet is still far from gelation concentration. The solvent at the center of the droplet continues to evaporate. As shown in FIG. 4E at t=1.6, the entire droplet reaches the gelation concentration.

System

Figure 5:
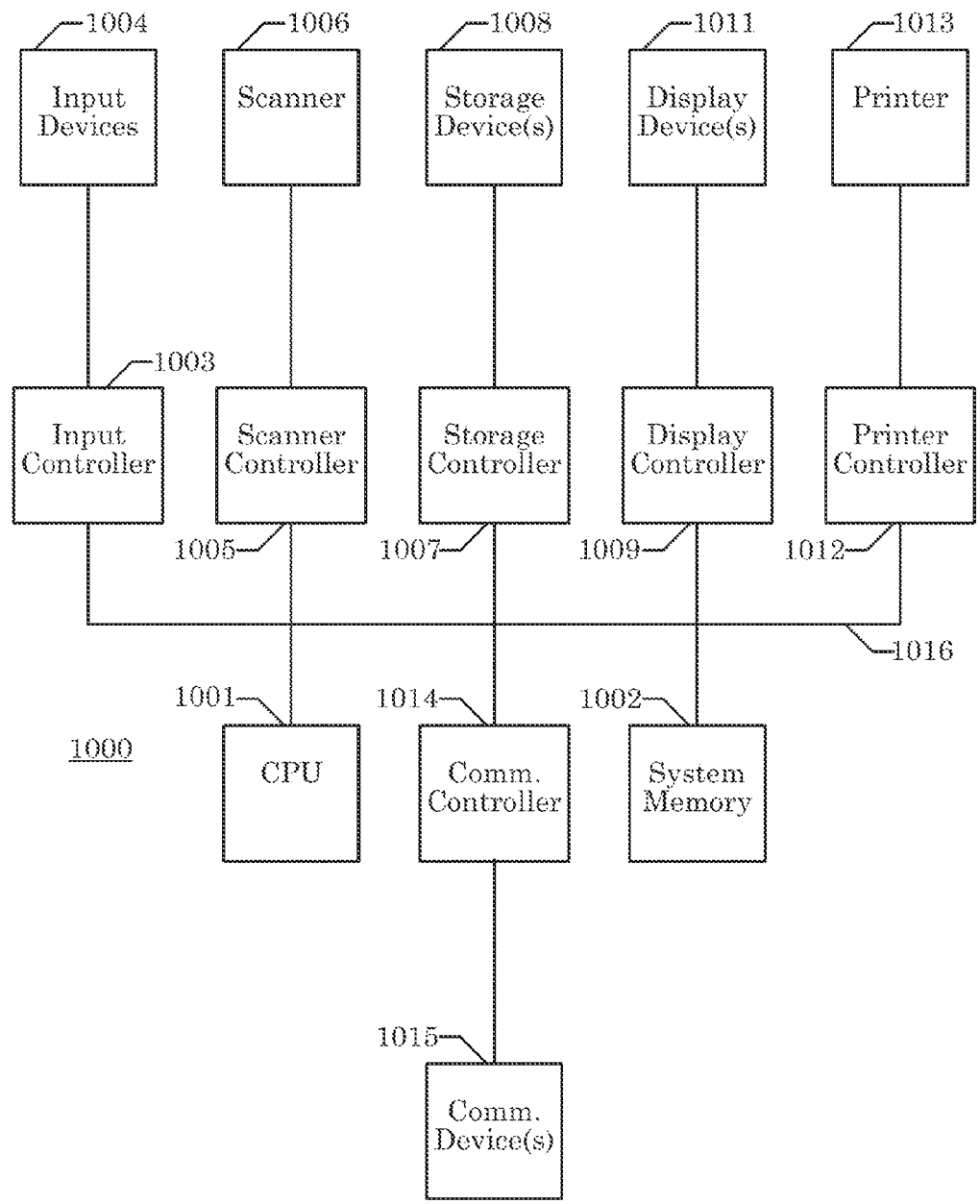
FIG. 5 is an illustration of a system on which an embodiment of the present invention may be implemented.

Having described the details of the invention, an exemplary system 1000, which may be used to implement one or more aspects of the present invention, will now be described with reference to FIG. 5. As illustrated in FIG. 5, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 5. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A non-transitory computer-readable medium encoded with instructions for a processor to perform a method for simulating a droplet of a fluid on a substrate in a simulation domain, comprising:
    instructions for dividing the simulation domain into a first sub-domain and a gap region with a retreated boundary, wherein the gap region defines a region of a specified width between a contact line of the droplet and the first sub-domain;
    instructions for generating a mesh that represents the first sub-domain as a plurality of elements, wherein the specification of each element includes an integer element number that represents a sequence order of that element relative to the other elements;
    wherein the specified width of the gap region is between 0.3 and 0.7 times the width of an element in the first sub-domain adjoining the gap region divided by the integer element number of the element in the first sub-domain adjoining the gap region;
    instructions for using a finite element method and the mesh to calculate a plurality of system variables indicative of a state of the droplet at a first point in time; and
    instructions for using a plurality of evolution equations that represent how the system variables vary over time to calculate system variables indicative of the state of the droplet at a second point in time.

2. The non-transitory computer-readable medium of claim 1, wherein the plurality of system variables include one or more functions including:
    a spatial function representative of the height of the droplet; and a solute concentration function that is representative of the concentration of solute in the droplet.

3. The non-transitory computer-readable medium of claim 1, wherein each element is a Lagrangian element.

4. The non-transitory computer-readable medium of claim 1, wherein the evolution equations represent the evaporation of a droplet, wherein the effect of evaporation is represented by a spatial function in which the evaporation rate is a non-zero value at the contact line of the droplet.

5. The non-transitory computer-readable medium of claim 1, wherein the width of the elements in the sub-domain adjoining the gap varies, and the width of the gap varies along with the elements in the sub-domain adjoining the gap.

6. The non-transitory computer-readable medium of claim 1, wherein the width of the gap is constant.

7. The non-transitory computer-readable medium of claim 1, wherein a testing function is defined in terms of a ghost cell that extends from the retreated boundary to a region of space outside the contact line and a shape function is defined in terms of a portion of the ghost cell that extends from the retreated boundary to the contact line.

8. A system including the non-transitory computer-readable medium, the instructions, and the processor for execution of the instructions to simulate a droplet of a fluid on a substrate in a simulation domain, as recited in claim 1.

9. The system of claim 8, wherein the plurality of system variables include one or more functions including: a spatial function representative of the height of the droplet; and a solute concentration function that is representative of the concentration of solute in the droplet.

10. The system of claim 8, wherein each element is a Lagrangian element.

11. The system of claim 8, wherein the evolution equations represent the evaporation of a droplet, wherein the effect of evaporation is represented by a spatial function in which the evaporation rate is a non-zero value at the contact line of the droplet.

12. The system of claim 8, wherein the width of the elements in the sub-domain adjoining the gap varies, and the width of the gap varies along with the elements in the sub-domain adjoining the gap.

13. The system of claim 8, wherein the width of the gap is constant.

14. The system of claim 8, wherein a testing function is defined in terms of a ghost cell that extends from the retreated boundary to a region of space outside the contact line and a shape function is defined in terms of a portion of the ghost cell that extends from the retreated boundary to the contact line.

* * * * *